(12) United States Patent
Teal et al.

(10) Patent No.: US 8,123,242 B2
(45) Date of Patent: Feb. 28, 2012

(54) FOLDING STEERING COLUMN FOR ELLIPTICAL BIKE AND METHOD OF USE

(75) Inventors: Brent C. Teal, Solana Beach, CA (US); Bryan L. Pate, Atherton, CA (US)

(73) Assignee: PT Motion Works, Inc., Solana Beach, CA (US)

( * ) Notice: Subject to any disclaimer, the term of this patent is extended or adjusted under 35 U.S.C. 154(b) by 0 days.

(21) Appl. No.: 12/781,086

(22) Filed: May 17, 2010

(65) Prior Publication Data

US 2010/0295262 A1    Nov. 25, 2010

Related U.S. Application Data

(60) Provisional application No. 61/179,635, filed on May 19, 2009.

(51) Int. Cl.
*B62K 21/16* (2006.01)
*B62M 1/04* (2006.01)

(52) U.S. Cl. ........ 280/221; 74/551.3; 280/278; 280/287

(58) Field of Classification Search .................. 280/278, 280/287, 87.05, 221, 252, 253, 259, 655.1; 74/551.3

See application file for complete search history.

(56) References Cited

U.S. PATENT DOCUMENTS

| | | | |
|---|---|---|---|
| 1,190,089 A | 7/1916 | Bellairs | |
| 1,287,130 A * | 12/1918 | Starkenberg | ................. 280/287 |
| 1,601,249 A | 9/1926 | Hayden | |
| 1,617,357 A | 2/1927 | Walter | |
| 1,750,187 A | 3/1930 | Miller et al. | |
| 2,424,639 A | 7/1947 | Sobiral | |
| 2,466,105 A | 4/1949 | Hoffman | |
| 2,723,131 A | 11/1955 | McChesney, Jr. | |
| 4,026,571 A | 5/1977 | Vereyken | |
| 4,077,648 A | 3/1978 | Seul | |
| 4,193,324 A | 3/1980 | Marc | |
| 4,379,566 A | 4/1983 | Titcomb | |
| 4,456,276 A | 6/1984 | Bortolin | |
| 4,577,879 A | 3/1986 | Vereyken | |

(Continued)

FOREIGN PATENT DOCUMENTS

CA    2434373    8/1996

(Continued)

OTHER PUBLICATIONS

Notification, International Search Report and Written Opinion dated Jan. 14, 2011 for PCT/US2010/35155.

(Continued)

*Primary Examiner* — Anne Marie M Boehler
(74) *Attorney, Agent, or Firm* — Stephen C. Beuerle; Procopio Cory Hargreaves & Savitch LLP

(57) ABSTRACT

A foldable steering column of vehicle including a steering member with a steering fork. The foldable steering column includes a base coupleable to the steering fork; a steering tube pivotally coupled to the base between at least a first position aligned with the base and second position not aligned with the base; and a sleeve operably associated with the base and the steering tube for positioning between a first position where the steering tube is secured to and aligned with the base and a second position where the steering tube is free to pivot relative to the base.

22 Claims, 3 Drawing Sheets

U.S. PATENT DOCUMENTS

| | | | |
|---|---|---|---|
| 4,666,173 A | 5/1987 | Graham | |
| 4,761,014 A | 8/1988 | Huang | |
| 4,821,832 A * | 4/1989 | Patmont | 180/208 |
| 4,824,130 A * | 4/1989 | Chiu | 280/239 |
| 4,850,245 A | 7/1989 | Feamster | |
| 4,973,046 A | 11/1990 | Maxwell | |
| 5,110,148 A | 5/1992 | Stienbarger | |
| 5,161,430 A | 11/1992 | Fabey | |
| 5,192,089 A | 3/1993 | Taylor | |
| 5,224,724 A | 7/1993 | Greenwood | |
| 5,261,294 A | 11/1993 | Ticer et al. | |
| 5,352,169 A | 10/1994 | Eschenbach | |
| 5,368,321 A | 11/1994 | Berman et al. | |
| 5,383,829 A | 1/1995 | Miller | |
| 5,419,572 A | 5/1995 | Stiller et al. | |
| 5,433,680 A | 7/1995 | Knudsen | |
| 5,458,022 A | 10/1995 | Mattfeld | |
| 5,527,246 A | 6/1996 | Rodgers, Jr. | |
| 5,566,589 A | 10/1996 | Buck | |
| 5,566,590 A | 10/1996 | Wan | |
| 5,591,107 A | 1/1997 | Rodgers, Jr. | |
| 5,611,757 A | 3/1997 | Rodgers, Jr. | |
| 5,879,017 A | 3/1999 | Debruin | |
| 5,893,820 A | 4/1999 | Maresh et al. | |
| 6,024,676 A | 2/2000 | Eschenbach | |
| 6,077,198 A | 6/2000 | Eschenbach | |
| 6,146,313 A | 11/2000 | Whan-Tong et al. | |
| 6,213,484 B1 * | 4/2001 | Rohner | 280/87.042 |
| 6,270,102 B1 | 8/2001 | Fan | |
| 6,398,244 B1 | 6/2002 | Chueh | |
| 6,398,695 B2 | 6/2002 | Miller | |
| 6,439,590 B1 | 8/2002 | Liang | |
| 6,474,193 B1 | 11/2002 | Farney | |
| 6,485,041 B1 | 11/2002 | Janssen | |
| 6,572,128 B2 | 6/2003 | Graf | |
| 6,581,492 B1 * | 6/2003 | Chen | 74/551.3 |
| 6,589,139 B1 | 7/2003 | Butterworth | |
| 6,640,662 B1 | 11/2003 | Baxter | |
| 6,648,353 B1 | 11/2003 | Cabal | |
| 6,648,355 B2 | 11/2003 | Ridenhour | |
| 6,659,486 B2 | 12/2003 | Eschenbach | |
| 6,663,127 B2 | 12/2003 | Miller | |
| 6,688,624 B2 | 2/2004 | Christensen et al. | |
| 6,689,019 B2 | 2/2004 | Ohrt et al. | |
| 6,715,779 B2 | 4/2004 | Eschenbach | |
| 6,726,600 B2 | 4/2004 | Miller | |
| 6,773,022 B2 | 8/2004 | Janssen | |
| 6,857,648 B2 | 2/2005 | Mehmet | |
| 6,877,756 B2 * | 4/2005 | Yamabe | 280/287 |
| 6,895,834 B1 | 5/2005 | Baatz | |
| D526,250 S | 8/2006 | Trumble et al. | |
| 7,140,626 B1 | 11/2006 | Keay | |
| 7,244,217 B2 | 7/2007 | Rodgers, Jr. | |
| 7,448,986 B1 | 11/2008 | Porth | |
| 7,686,114 B2 | 3/2010 | Kim | |
| 7,717,446 B2 | 5/2010 | Pate | |
| 2002/0151412 A1 | 10/2002 | Lee | |
| 2003/0025293 A1 | 2/2003 | Drew | |
| 2003/0193158 A1 | 10/2003 | Hung | |
| 2004/0145141 A1 * | 7/2004 | Dennis | 280/87.05 |
| 2005/0248117 A1 | 11/2005 | Hung | |
| 2007/0024019 A1 | 2/2007 | Tarlow | |
| 2007/0114749 A1 | 5/2007 | Tal | |
| 2007/0235974 A1 | 10/2007 | Vargas | |

FOREIGN PATENT DOCUMENTS

| | | |
|---|---|---|
| CA | 2670278 A1 | 11/2007 |
| KR | 20-0251020 | 11/2001 |
| KR | 20-0261766 | 1/2002 |
| KR | 20-0418734 Y1 | 6/2006 |
| KR | 10-2009-0043621 A | 5/2009 |
| WO | 03022670 | 3/2003 |
| WO | 2009-019285 | 2/2009 |

OTHER PUBLICATIONS

European Communication and Supplementary European Search Report for European Patent Application No. 07840033 dated Sep. 20, 2010.

International Search Report and Written Opinion from PCT/US2010/035281 issued Dec. 3, 2010, 8 pages.

* cited by examiner

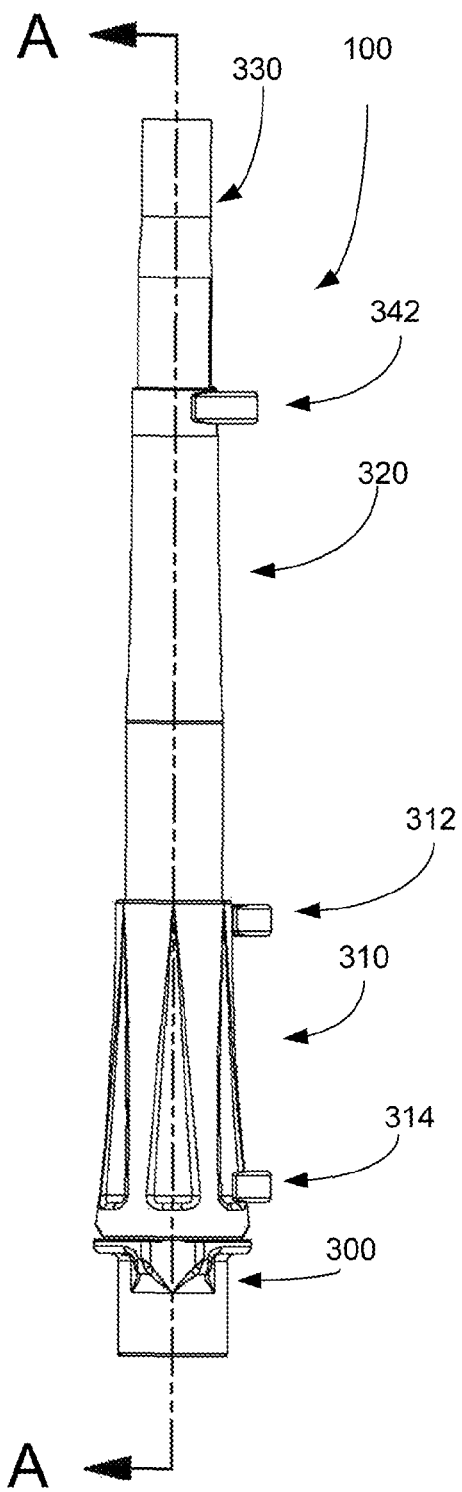
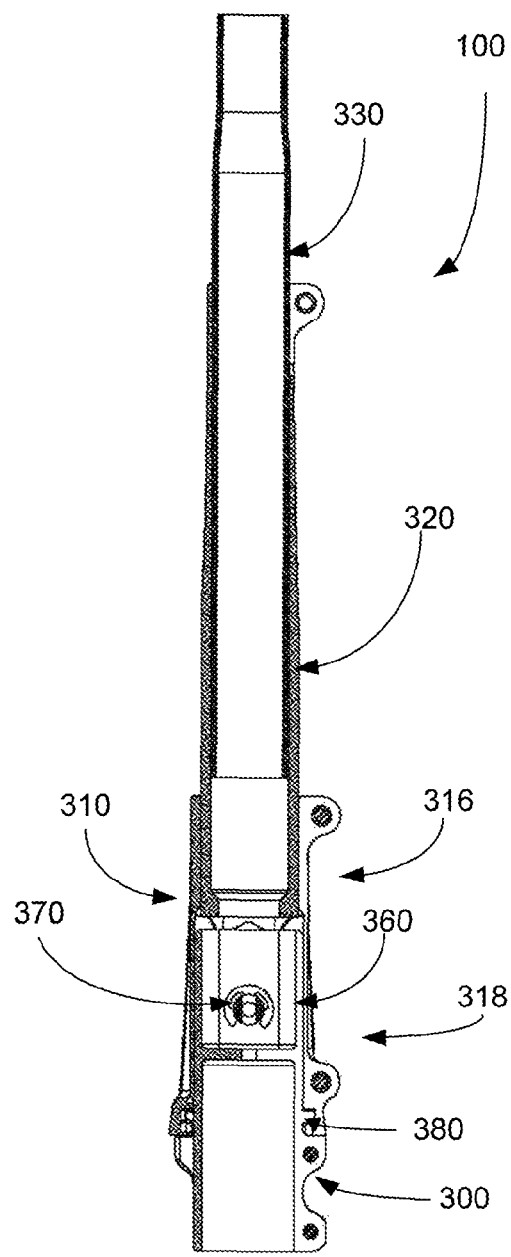
SECTION A-A
Figure 3A                    Figure 3B

FOLDING STEERING COLUMN FOR ELLIPTICAL BIKE AND METHOD OF USE

CROSS-REFERENCE TO RELATED APPLICATIONS

This application claims priority to U.S. provisional patent application 61/179,635 filed on May 19, 2009 under 35 U.S.C. 119(e). U.S. provisional patent application 61/179,635 is hereby incorporated by reference as though set forth in full.

BACKGROUND

1. Field of the Invention

The present invention relates generally to bicycles and similar vehicles, more particularly to foldable steering systems for bicycles and similar vehicles, and even more particularly to foldable steering systems for elliptical bicycles.

2. Related Art

U.S. Published Application 2008/0116655, which is incorporated by reference herein, discloses a self-propelled vehicle propelled by an elliptical drive train (hereinafter referred to as "elliptical bicycle"). Folding bicycles known in the art use a hinged extender tube to enable the extender tube to fold. This is possible because the extender tube lengths are relatively short (12-15"). For extender tubes that are significantly longer (25-30"), such a design is unacceptable because of the potential forces that could be applied by the rider to the folding mechanism and the need to minimize the weight of the system. For example, a 30" extender tube made of 6061 aluminum that used a hinge system to achieve folding could shear under the forces created by a 250-pound rider making a quick stop from high speed.

SUMMARY

An aspect of the invention involves a foldable steering column on an elliptical bicycle, conventional upright bicycle, recumbent bicycle, scooter or similar vehicle that can handle the significant loads created by the use of a long steering tube. The foldable steering column distributes the load from the rider's force across the sleeve, which has a significantly larger diameter and area than previous designs so it can handle those forces.

The improved foldable steering column includes a base, a sleeve, and a steering tube. The base is coupled to a fork steerer tube and the steering tube. The coupling to the steering tube is effected by a coupling mechanism that allows the steering tube to pivot about the coupling mechanism. The sleeve is designed such that it can slide over both the steering tube and the base such that when it is in a down position, the steering tube cannot pivot, but is held rigidly in line with the fork steerer tube. However, when the sleeve is in an up position, the steering tube can pivot. One or more quick-release clamps or other tightening means may be incorporated to hold the sleeve tightly to the steering tube in the upright and/or folded positions. In addition, safety features such as a mechanical detent, an external pin connector, slotting, and/or keying may be incorporated to communicate to the user when the foldable steering column is in the correct desired position and to ensure that the foldable steering column remains in that position. In addition, the steering tube may be adjustable to allow the operator to change the height of a connected handlebar assembly. To facilitate adjustment, the steering tube may include one or more extender tubes as adjustable members. In an embodiment of the foldable steering column, the adjustment mechanism is through a telescoping-type arrangement between the steering tube and an extender tube. The sleeve may have notching such that when the steering tube is in a folded position it can be held/maintained at a 90 degree angle relative to the fork steerer tube to, for example, serve as a support where people can grab to load the bicycle into and out of cars, trucks, bicycle racks, etc.

Another aspect of the invention involves a foldable steering column of vehicle including a steering member with a steering fork. The foldable steering column includes a base coupleable to the steering fork; a steering tube pivotally coupled to the base between at least a first position aligned with the base and second position not aligned with the base; and a sleeve operably associated with the base and the steering tube for positioning between a first position where the steering tube is secured to and aligned with the base and a second position where the steering tube is free to pivot relative to the base.

A further aspect of the invention involves an apparatus including a frame having a drive wheel rotatably supported thereupon, and a pivot axis defined thereupon; a steerable front wheel coupled to the frame and to a foldable steering column; a first and a second foot link, each having a first end, a second end, and a foot receiving portion defined thereupon; a coupler assembly which is in mechanical communication with said pivot axis and with a first end of each of said first and second foot links, being operative to direct said first ends of said foot links in an arcuate path of travel; a foot link guide supported by said frame, said guide being operable to engage a second end of each of said foot links, and to direct said second ends along a reciprocating path of travel; and a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel and said power transfer linkage transfers power from said coupler assembly to said drive wheel, so as to supply propulsive power thereto.

One or more implementations of the aspects of the invention described above include one or more of the following: the steering tube is extendable to a desired length; the steering tube includes an extender tube and a telescoping assembly for extending the extender tube to a desired length; the steering tube is coupled to an extender tube; the steering member is a fork steerer tube; the sleeve is slidable over both the base and the steering tube; one or more securement mechanisms to secure the sleeve relative to the steering tube; one or more securement mechanisms include one or more quick-release clamps; one or more securement mechanisms secure the steering tube to the base, and the one or more securement mechanisms include a safety catch and the sleeve is rotatable between at least a first position to engage the safety catch to secure the steering tube to the base and a second position to disengage the safety catch to unsecure the steering tube relative to the base for allowing pivoting movement of the steering tube relative to the base; at least one of a mechanical detent, an external pin connector, slotting, and/or keying to communicate to the user when the foldable steering column is in a correct desired position and to ensure that the foldable steering column remains in that position; one or more securement mechanisms to secure the steering tube in the second position not aligned with the base; the one or more securement mechanisms include a pin assembly to secure the steering tube in the second position not aligned with the base; the steering tube includes a handlebar assembly; the extender tube includes a handlebar assembly; the vehicle is a bicycle;

and/or the bicycle is an elliptical bicycle including a frame with a pivot axis defined thereupon; a steering mechanism coupled to the frame; a front wheel and a rear wheel coupled to the frame, the rear wheel including a rear wheel axle coupled to the pivot axis; a foot link including a foot receiving portion for receiving a user's foot, a front end, and a rear end, and the foot receiving portion travels in an elliptical path.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3A is a left side-elevational view of the foldable steering column of FIG. 1A; and FIG. 3B is a cross-sectional view of the foldable steering column taken along line A-A of FIG. 3A.

DETAILED DESCRIPTION

Figure 1A:
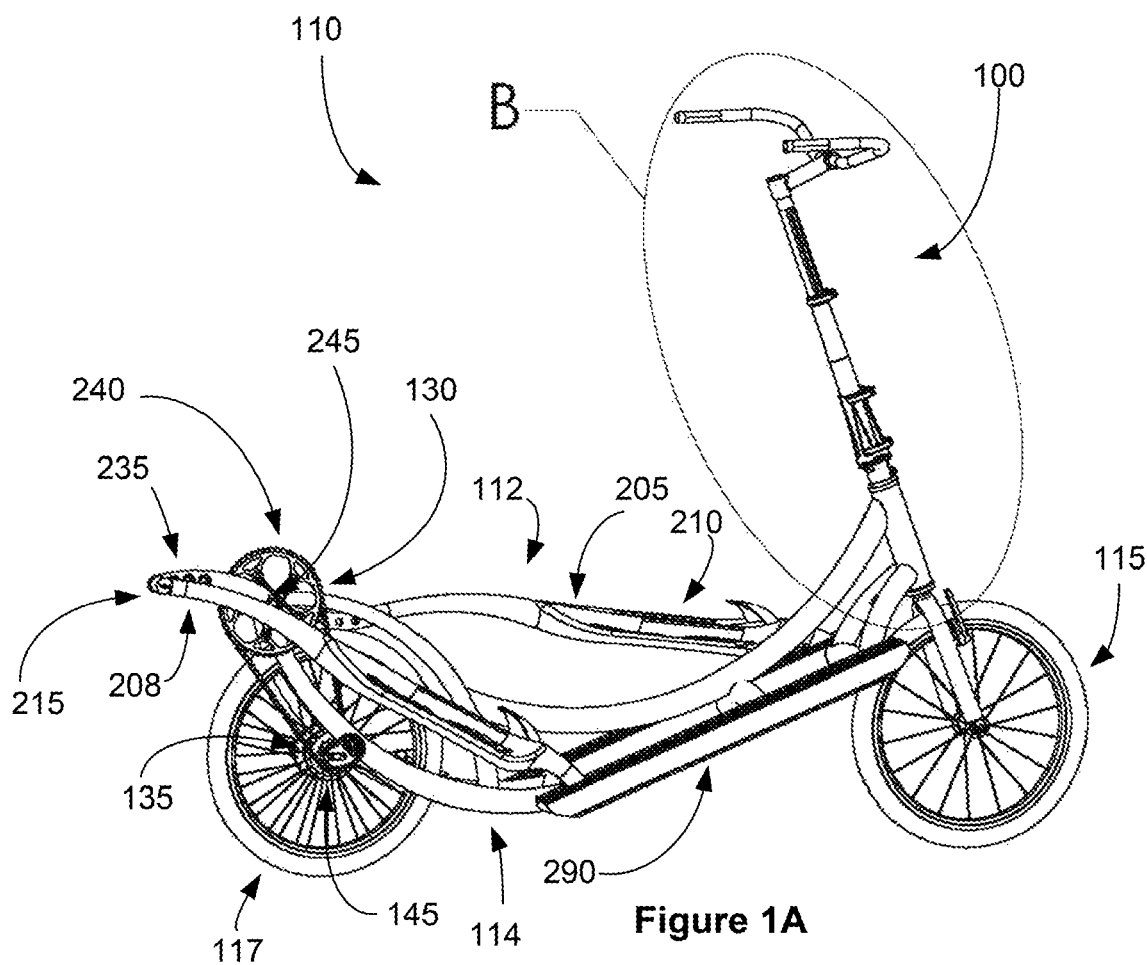
FIG. 1A is a front-elevational view of an embodiment of an elliptical bicycle including a foldable steering column constructed in accordance with an embodiment of the invention and shows the foldable steering column in an upright position.
Figure 1B:
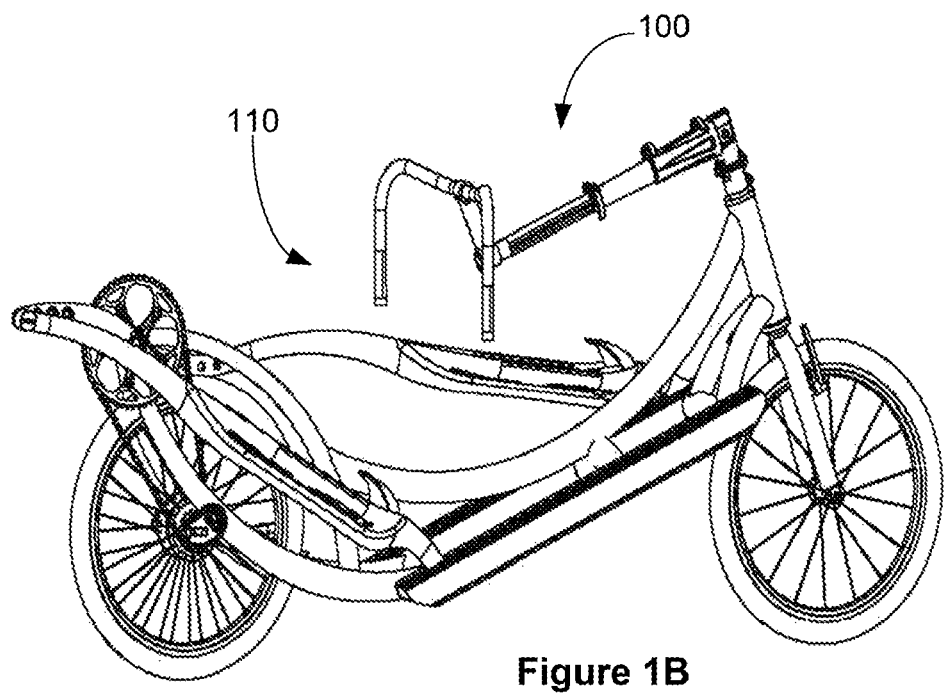
FIG. 1B is a front-elevational view of the elliptical bicycle of FIG. 1A and shows the foldable steering column in a folded position.
Figure 2:
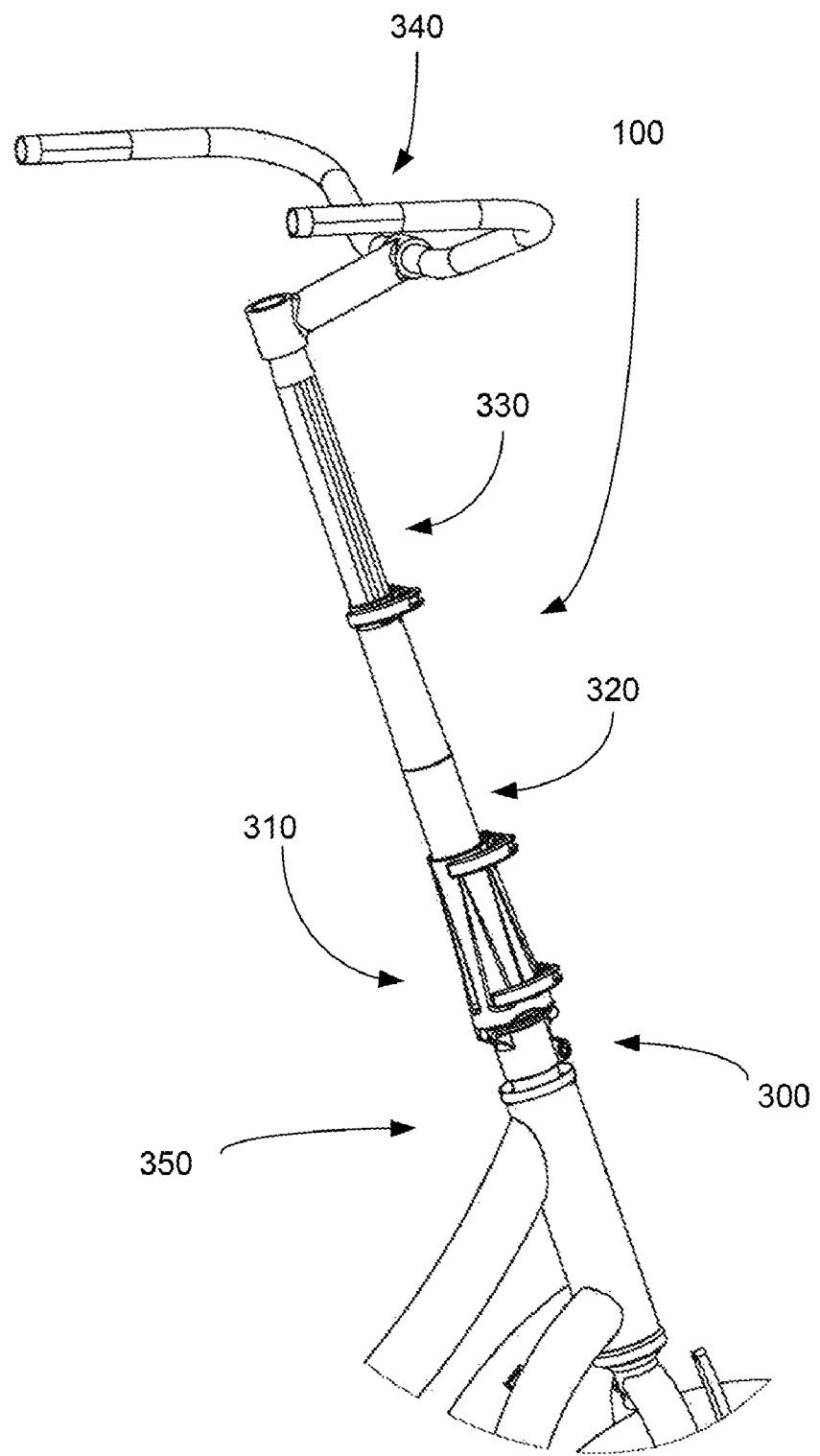
FIG. 2 is an enlarged perspective view of the foldable steering column of FIG. 1A taken along area B of FIG. 1A.

With reference to FIGS. 1A-3B, an embodiment of a foldable steering column 100 of an elliptical bicycle 110 is shown. Although the foldable steering column 100 will be shown and described with respect to an elliptical bicycle, in alternative applications, the foldable steering column 100 is applied to other type of vehicles such as, but not limited to, conventional/traditional pedal and crank bicycles, recumbent bicycles, folding bicycles, adult scooters, kids scooters, electric scooters, human-powered vehicles, similar vehicles where significant loads are imparted to a long extender tube of the bicycle or vehicle, and/or any vehicle that has a long steering column that would be improved by being able to fold that steering column. Before describing the foldable steering column 100, the elliptical bicycle 110 will first be described.

The elliptical bicycle 110 includes a foot link assembly 112 movably mounted on a frame, or frame structure 114, on which one or more wheels (front wheel 115, rear wheel 117) are mounted. Generally, each foot link assembly 112 is movably mounted to the frame 114 at its forward end where it is slidably coupled to a foot link guide track 290 and at its rearward end where it is rotatably coupled to a crank assembly 215.

Generally, each foot link assembly 112 includes a foot link 205, each with a foot platform 210, and a foot link coupler (not shown). The foot platforms 210 on which the operator stands are mounted on an upper surface of each foot link 205 near a forward end of each foot link 205. Two foot link guide tracks 290 run parallel to each other on either side of the longitudinal axis of the elliptical bicycle 110 and are connected to or integral with the frame 114.

At the rear of the elliptical bicycle 110, adjacent the rear wheel 117, are crank arms 235, drive sprocket 240, crank arm bearing 245, chain 130, rear wheel sprocket 135, and rear wheel hub 145. The crank arms 235 are mated to the crank arm bearing 245, which is coupled to the frame 114 of the elliptical bicycle 110, to turn drive sprocket 240.

During pedaling, the operator (not shown) uses his mass in a generally downward and rearward motion as in walking or jogging to exert a force on the foot platforms 210 and thereby, the foot links 205. This force causes the foot link coupler to move along the foot link guide track 290 towards the rear of the elliptical bicycle 110 and rotate the crank arms 235 about the crank arm bearing 245, turning the drive sprocket 240. As with conventional bicycles, rotating the drive sprocket 240 causes the rear wheel sprocket 135 to rotate because they are linked by the chain 130. It will be appreciated that the chain 130 may be replaced by a belt, a rotating shaft or other drive means, and that the chain 130, drive sprocket 240, and rear wheel sprocket 135 could be eliminated entirely by coupling the crank arms 235 directly to the rear wheel hub 145. Rotating the rear wheel sprocket 135 causes the rear wheel 117 to rotate because the rear wheel sprocket 135 is attached to the rear wheel hub 145. Rotating the rear wheel 117 provides motive force that enables the elliptical bicycle 110 to move along a surface. The elliptical bicycle 110 can employ a "fixed" or "free" rear wheel, as is known in the art. The elliptical bicycle 110 can also employ a planetary gear hub or derailleur system having different gear ratios.

In an alternative embodiment of the elliptical bicycle, the foot link guide tracks 290 are replaced by swing arms (not shown) pivotally coupled to the frame 114. Each foot link assembly 112 is coupled to swing arms (not shown) at its forward end. The swing arms enable the forward ends of each foot link assembly 112 to travel in a reciprocating path when the rear ends of each foot link assembly 112 move along an arcuate path.

Pedaling motion in the elliptical bicycle 110 as described above results in the operator's foot traveling in a shape that can be described as generally elliptical. Propulsion using an elliptical pedaling motion, as opposed to an up-and-down pedaling motion or a circular pedaling motion, has the advantage of substantially emulating a natural human running or walking motion. Further, an elliptical pedaling motion is a simpler and a more efficient means to rotate the rear wheel 117 than is, for example, a vertical pumping motion. Moreover, the major axis of the ellipse in an elliptical pedaling motion can be much longer than the stroke length of a circular or vertical pumping pedaling motion, allowing the operator to employ a larger number of muscle groups over a longer range of motion during the pedal stroke than he or she could employ in a circular or up and down pedaling motion.

The foldable steering column 100 of the elliptical bicycle 110 will now be described in more detail. The foldable steering column 100 includes a base 300, a sleeve 310, and a steering tube 320. In this embodiment, the sleeve 310 includes a pair of sleeve fasteners (e.g., quick-release clamps or other tightening means) 312, 314 corresponding to upper clamp area 316 and lower clamp area 318 that, when tightened, hold the sleeve 310 securely to the steering tube 320 in both the upright position, eliminating any play between the base 300 and the steering tube 320 that may affect steering performance, and folded positions. A telescoping extender tube 330 is telescopingly and slidably received within the steering tube 320. A handlebar assembly 340 is connected to an upper terminal end of the extender tube 330. An extender fastener 342 can be tightened to secure the extender tube 330 with respect to the steering tube 320 or released to adjust the height of the handlebar assembly 340. In alternative embodiments, other number(s) and types of fasteners may be used, including bolts or clamps. The base 300 is coupled to (e.g., clamps around) a fork steerer tube 350 (e.g., after the fork steerer tube 350 passes through the frame 114 and headset bearings) and the steering tube 320. The coupling to the steering tube 320 is effected by a coupling mechanism 360 that pivotally connects the steering tube 320 to the base 300 about a pin 370.

In this embodiment, the sleeve 310 has a safety lock feature/operation. The sleeve 310 is designed such that it can slide over both the steering tube 320 and the base 300 such that when it is in a down position, the steering tube 320 cannot pivot, but is held rigidly in line with the fork steerer tube 350. However, when the sleeve 310 is in an up position, the steering tube 320 (and rest of the upper portion of the foldable steering column 100) can pivot. To unlock the sleeve 310 and fold the foldable steering column 100 downward to the position shown in FIG. 1B, the bottom fasteners 312, 314 are undone, the sleeve 310 is rotated 90 degrees to disengage the sleeve 310 from a safety key/catch 380 of the base 300, and the sleeve 310 is slid upwards, allowing the steering tube 320 to pivot downwards, about the pin 370, to the position shown in FIG. 1B. The bottom fasteners 312, 314 can then be tightened so that the sleeve 310 is secured to the steering tube 320. To lock the foldable steering column 100 into the position shown in FIG. 1A, the steering tube 320 (along with extender tube 330 and handlebar assembly 340) are pivoted upwards so that the steering tube 320 is vertically aligned with the base 300. The bottom fasteners 312, 314 are released and sleeve 310 is slid downwards over the base 300. The sleeve 310 is rotated 90 degrees to engage the safety key 380 of the base 300, and the bottom fasteners 312, 314 are tightened so that the sleeve 310 is secured to the steering tube 320.

In addition, safety features such as a mechanical detent, an external pin connector, slotting, and/or keying may be incorporated to communicate to the user when the foldable steering column 100 is in the correct desired position and to ensure that the foldable steering column 100 remains in the correct position. The sleeve 310 may have notching such that when the steering tube 320 is in a folded position it can be held at around a 90 degree angle relative to the fork steerer tube 350 to, for example, serve as a support where people can grab to load the bicycle into and out of cars, trucks, bicycle racks, etc. In another embodiment, the foldable steering column 100 includes a pin that passes through the sleeve 310 and the base 300 or steering tube 320 after the sleeve 310 is moved to the downward position. When in place, this pin would prevent the load bearing sleeve 310 from moving upwards. The function performed by this pin can be achieved in a number of ways, including by a simple detent pin that is removed externally or by a captivated spring-loaded pin.

Accordingly, the foldable steering column 100 can handle the significant loads created by the use of a long steering tube. The foldable steering column 100 distributes the load from the rider's force across the sleeve 310, which has a significantly large diameter and area to handle those forces.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A foldable steering column of vehicle including a steering member with a steering fork, comprising:
    a base coupleable to the steering fork;
    a steering tube pivotally coupled to the base between at least a first position aligned with the base and second position not aligned with the base; and
    a sleeve operably associated with the base and the steering tube for axial slidable movement between a fully down position where the steering tube is secured to and aligned with the base and a up position where the steering tube is free to pivot relative to the base,
    a safety catch system coupled to the base and the sleeve including in the fully down position at least a locked position and an unlocked position, each of which are effected with rotation of the sleeve without axial movement of the sleeve, such that when the sleeve is oriented relative to the base in the locked position, the sleeve is prevented from disengaging from the base and when the sleeve is oriented in the unlocked position, the sleeve can be easily disengaged with the base,
    wherein the sleeve includes at least one clamp area with at least one clamping mechanism operable to securely hold the sleeve to the steering tube when tightened, eliminating any play between the base and the steering tube that may affect steering performance.

2. The foldable steering column of claim 1, wherein the steering tube is extendable to a desired length.

3. The foldable steering column of claim 2, wherein the steering tube includes a telescoping assembly for extending the steering tube to a desired length.

4. The foldable steering column of claim 1, wherein the steering tube is coupled to an extender tube.

5. The foldable steering column of claim 4, wherein the extender tube includes a handlebar assembly.

6. The foldable steering column of claim 1, wherein the steering member is a fork steerer tube.

7. The foldable steering column of claim 1, wherein the sleeve is slidable over both the base and the steering tube.

8. The foldable steering column of claim 1, further including at least one of a mechanical detent, an external pin connector, slotting, and/or keying to communicate to the user when the foldable steering column is in a correct desired position and to ensure that the foldable steering column remains in that position.

9. The foldable steering column of claim 1, wherein the steering tube includes a handlebar assembly.

10. The foldable steering column of claim 1, wherein the vehicle is a bicycle.

11. The foldable steering column of claim 1, wherein the bicycle is an elliptical bicycle including a frame with a pivot axis defined thereupon;
a steering mechanism coupled to the frame;
a front wheel and a rear wheel coupled to the frame, the rear wheel including a rear wheel axle coupled to the pivot axis;
a foot link including a foot receiving portion for receiving a user's foot, a front end, and a rear end, and the foot receiving portion travels in an elliptical path.

12. An apparatus, comprising:
a frame having a steering fork, a foldable steering column, a steering member, a drive wheel rotatably supported thereupon, and a pivot axis defined thereupon;
a steerable front wheel coupled to the frame and to the foldable steering column;
a first and a second foot link, each having a first end, a second end, and a foot receiving portion defined thereupon;
a coupler assembly which is in mechanical communication with said pivot axis and with a first end of each of said first and second foot links, being operative to direct said first ends of said foot links in an arcuate path of travel;
a foot link guide supported by said frame, said guide being operable to engage a second end of each of said foot links, and to direct said second ends along a reciprocating path of travel;
a power transfer linkage in mechanical communication with said coupler assembly and with said drive wheel;
whereby when the first end of one of said foot links travels in said arcuate path and the second end of that foot link travels in said reciprocal path, an operator's foot supported thereupon travels in a generally elliptical path of travel and said power transfer linkage transfers power from said coupler assembly to said drive wheel, so as to supply propulsive power thereto,
wherein the foldable steering column includes:
a base coupleable to the steering fork;
a steering tube pivotally coupled to the base between at least a first position aligned with the base and second position not aligned with the base; and
a sleeve operably associated with the base and the steering tube for axial slidable movement between a fully down position where the steering tube is secured to and aligned with the base and a up position where the steering tube is free to pivot relative to the base,
a safety catch system coupled to the base and the sleeve including in the fully down position at least a locked position and an unlocked position, each of which are effected with rotation of the sleeve without axial movement of the sleeve, such that when the sleeve is oriented relative to the base in the locked position, the sleeve is prevented from disengaging from the base and when the sleeve is oriented in the unlocked position, the sleeve can be easily disengaged with the base,
wherein the sleeve includes at least one clamp area with at least one clamping mechanism operable to securely hold the sleeve to the steering tube when tightened, eliminating any play between the base and the steering tube that may affect steering performance.

13. The apparatus of claim 12, wherein the steering tube is extendable to a desired length.

14. The apparatus of claim 13, wherein the steering tube includes a telescoping assembly for extending the steering tube to a desired length.

15. The apparatus of claim 12, wherein the steering tube is coupled to an extender tube.

16. The apparatus of claim 15, wherein the extender tube includes a handlebar assembly.

17. The apparatus of claim 12, wherein the steering member is a fork steerer tube.

18. The apparatus of claim 12, wherein the sleeve is slidable over both the base and the steering tube.

19. The apparatus of claim 12, further including at least one of a mechanical detent, an external pin connector, slotting, and/or keying to communicate to the user when the foldable steering column is in a correct desired position and to ensure that the foldable steering column remains in that position.

20. The apparatus of claim 12, wherein the steering tube includes a handlebar assembly.

21. The apparatus of claim 1, wherein the base includes a constant diameter both immediately above and below the safety catch system.

22. The apparatus of claim 12, wherein the base includes a constant diameter both immediately above and below the safety catch system.

* * * * *